United States Patent [19]

Endo et al.

[11] Patent Number: 4,939,601
[45] Date of Patent: Jul. 3, 1990

[54] PLAYBACK APPARATUS HAVING A SINGLE MODE SELECTING PUSHBUTTON

[75] Inventors: Hirotaka Endo; Hiroshi Hamanaka; Atsushi Nagayoshi, all of Osaka, Japan

[73] Assignee: Matsushita Electric Industrial Co., Ltd., Osaka, Japan

[21] Appl. No.: 223,696

[22] Filed: Jul. 22, 1988

[30] Foreign Application Priority Data

Jul. 23, 1987 [JP] Japan ............................ 62-183998
Jul. 23, 1987 [JP] Japan ............................ 62-184004
Jul. 23, 1987 [JP] Japan ............................ 62-184005

[51] Int. Cl.⁵ .................................................. G11B 5/00
[52] U.S. Cl. ................................................... 360/137
[58] Field of Search ............................. 360/137, 69

[56] References Cited

U.S. PATENT DOCUMENTS 4,101,949  7/1978  Cicatelli ............................ 360/137
4,788,713  11/1988  Hashimoto ...................... 360/137

*Primary Examiner*—Robert S. Tupper
*Attorney, Agent, or Firm*—Pollock, VandeSande & Priddy

[57] ABSTRACT

A portable playback apparatus includes a manually operated single pushbutton and a control circuit connected to the pushbutton for selectively determining one of a plurality of operating modes of the apparatus in accordance with successive depressions of the pushbutton, or duration of each depression, or in accordance with the number of depressions. The single pushbutton may be attached to an earpiece cord or located on one end face of a housing of the apparatus which is convenient to use.

19 Claims, 5 Drawing Sheets

PLAYBACK APPARATUS HAVING A SINGLE MODE SELECTING PUSHBUTTON

BACKGROUND OF THE INVENTION

The present invention relates generally to a playback apparatus and, more specifically, to a playback apparatus having an electrically operated mode selecting mechanism.

In conventional tape playback apparatus of the type having an electrically controlled mode selecting mechanism, a plurality of function keys are provided to operate the apparatus in a desired mode. However, the mode-associated function keys are not necessarily a convenient device for selecting modes when carrying the apparatus outdoors. To this end, one prior art solution involves attaching a remote control device to an earpiece cord for exclusively using it in selecting specified modes such as frequently operated playback and stop modes. However, the remote control device is bulky and not capable of controlling all the functions of the playback apparatus.

SUMMARY OF THE INVENTION

It is therefore an object of the present invention to provide a playback apparatus having a remote control device which is compact, easy to use and allows selection of any operating modes of the apparatus.

The playback apparatus of the present invention comprises a manually operated single pushbutton and a control circuit connected to the pushbutton for selectively determining one of a plurality of operating modes of the apparatus in accordance with successive depressions of the pushbutton, or duration of each depression, or in accordance with the number of depressions. Preferably, the single pushbutton is attached to an earpiece cord or located on one end face of a housing of the apparatus which is convenient to use.

BRIEF DESCRIPTION OF THE DRAWINGS

The present invention will be described in further detail with reference to the accompanying drawings, in which.

DETAILED DESCRIPTION OF THE INVENTION

Figure 1:
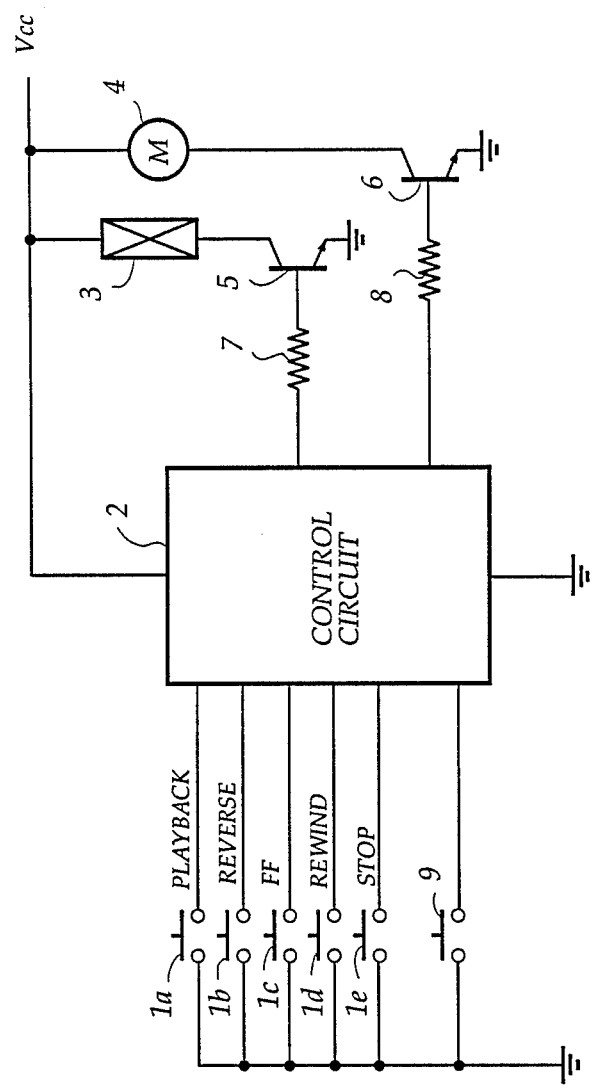
FIG. 1 is a circuit diagram of a portable playback apparatus of the present invention.

Referring now to FIG. 1, a portable tape playback apparatus of the invention comprises an array of mode selection keys 1a through 1e labelled respectively "playback", "reverse", "fast-forward", "rewind" and "stop". These keys are coupled to a microprocessor-based mode control circuit 2. A manually operated, mode selection pushbutton 9 is also coupled to the control circuit. Control circuit 2 responds to the function keys 1a to 1e in the same manner as in conventional tape recording/playback apparatus to operate transistors 5 and 6 through resistors 7 and 8, the collectors of transistors 5 and 6 being coupled respectively to a plunger 3 and a motor 4, the drive elements of the mechanism of the apparatus.

Figure 2:
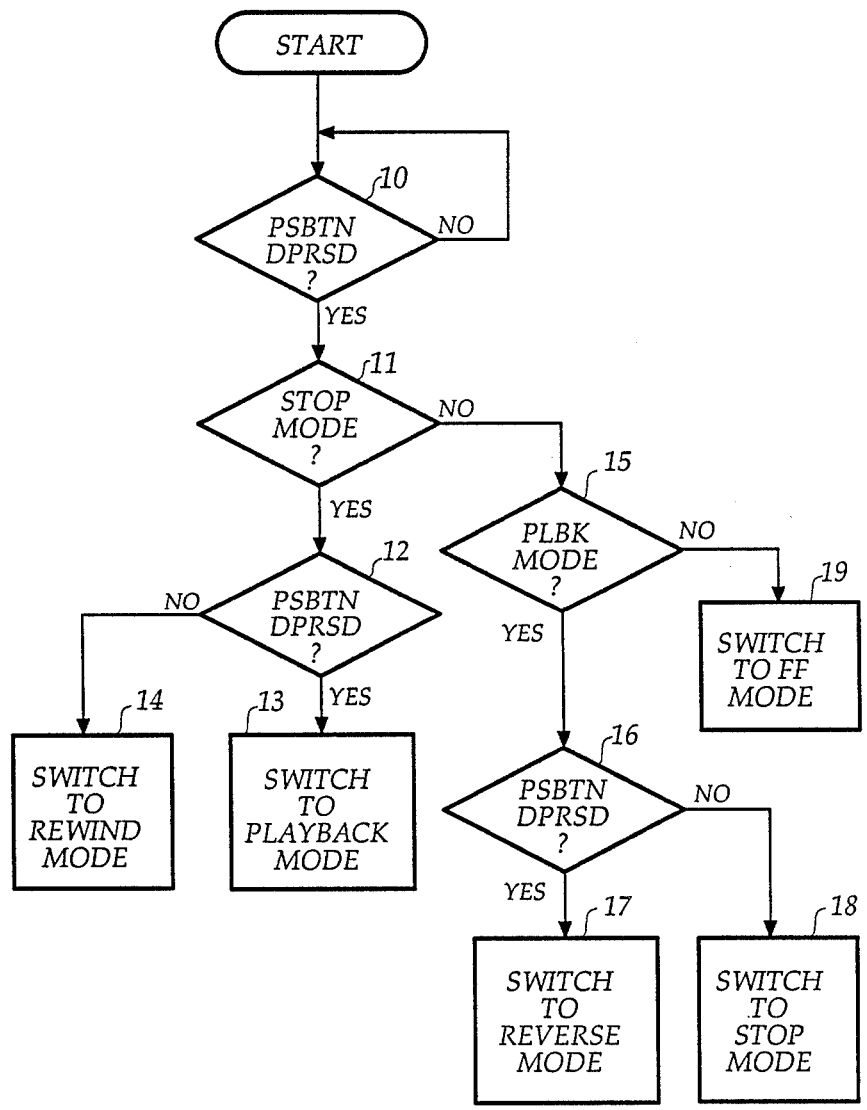
FIG. 2 is a flow diagram describing programmed instructions performed by the control circuit of FIG. 1 in accordance with successive depressions of the pushbutton.

Microprocessor-based control circuit 2 is programmed to perform instructions depicted in FIG. 2. The program starts with decision block 10 which checks to see if the pushbutton 9 is momentarily depressed. If it is, exit is to decision block 11 which checks to the see if the mechanism is in a "stop" mode. If the answer is affirmative, control proceeds to decision block 12 to check for the second brief depression of the pushbutton 9. If the pushbutton is again operated, exit is to operations block 13 which directs the switching of the mechanism to a playback mode. If the pushbutton is not operated again, exit is to operations block 14 which directs the switching of the mechanism to a rewind mode. If the pushbutton 9 is first depressed while the mechanism is not in a stop mode, control quits from decision block 11 to decision block 15 which checks to see if the mechanism is in a playback mode. If it is, exit is to decision block 16 which checks for a brief depression of the pushbutton 9. If there is one, exit is to operations block 17 which directs the switching of the mechanism to a reverse mode in which the direction of tape motion is reversed, and if there is none, exit is to operations block 18 which directs the switching of the mechanism to a stop mode. If the answer in block 15 is negative, control advances to operations block 19 which directs the switching of the mechanism to a fast-forward mode. Therefore, finger actions on pushbutton 9 cause the mechanism to assume one of the five operating modes of the apparatus depending on the number of finger actions.

Figure 4:
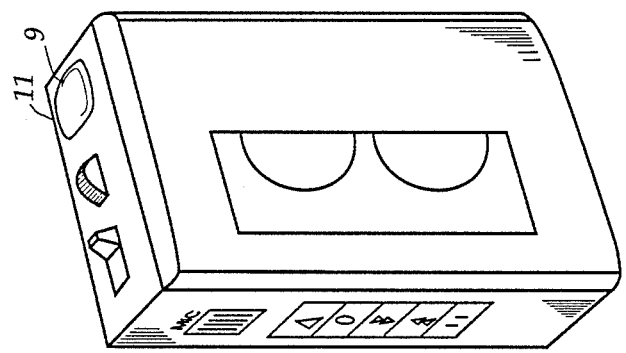
FIG. 4 is a perspective view of the portable playback apparatus with the pushbutton being located on one end face of the apparatus housing.
Figure 3:
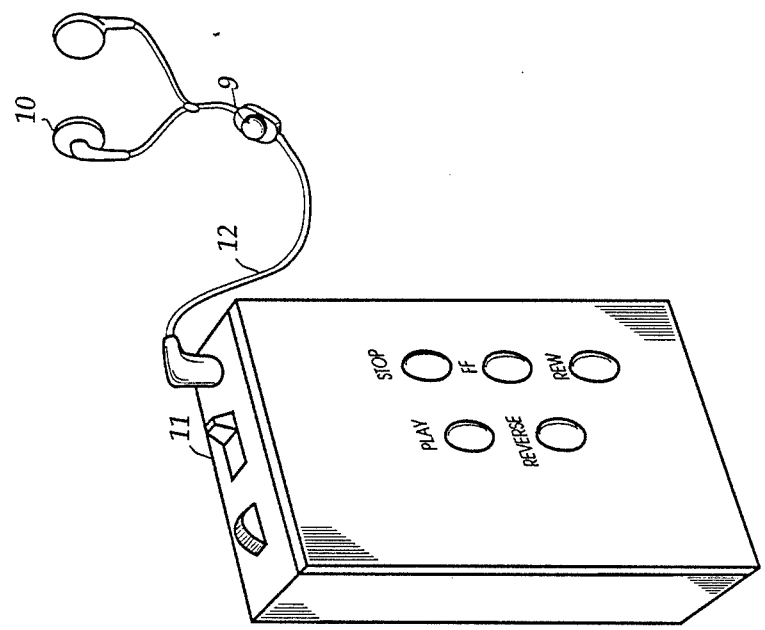
FIG. 3 is a perspective view of the portable playback apparatus of FIG. 1 with the pushbutton being attached to an earpiece cord.

The mode selecting pushbutton 9 can be attached to a cord 12 which leads from a main unit 11 to earpieces 10 as shown in FIG. 3. In this way, even when the main unit 11 is stored away in a briefcase or the like, the pushbutton 9 can be located near the user, to be used as a remote control device. It is also advantageous to locate the pushbutton 9 on one end face of the main unit 11 as shown in FIG. 4 where it is most convenient for the user to operate.

Figure 5:
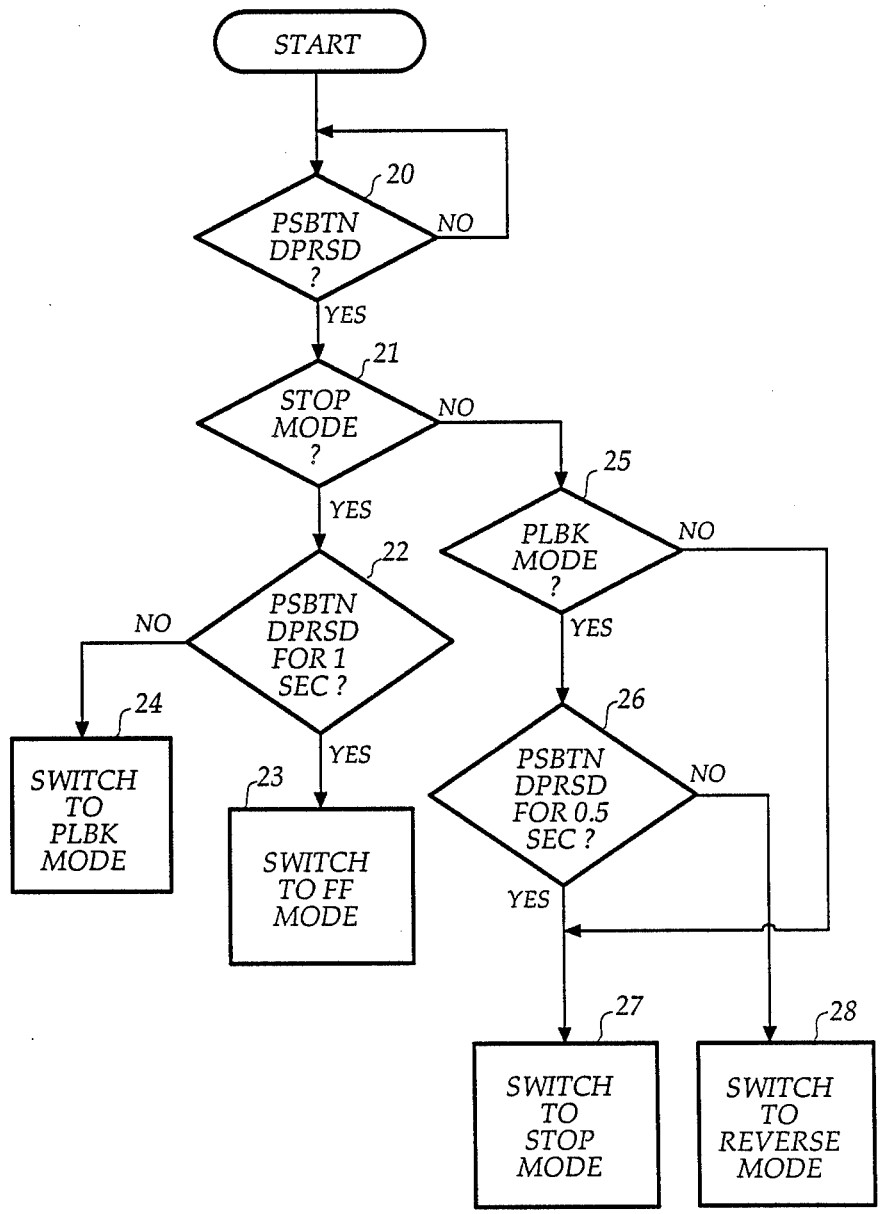
FIG. 5 is a flow diagram of describing programmed instructions performed by the control circuit in accordance with different duration of pushbutton depressions.

The mode switching signal can alternatively be represented by the length of time during which the pushbutton 9 is depressed. FIG. 5 is a flow diagram for implementing this approach. The program starts with operations block 20 which checks to see if the pushbutton 9 is briefly depressed. If it is, exit is to decision block 21 which checks to see if the mechanism is in a stop mode. If the answer is affirmative, exit is to decision block 22 which checks to see if the pushbutton 9 is depressed for an interval longer than 1 second or not. If depressed for an interval longer than 1 second, control exits to operations block 23 which directs the switching of the mechanism to a fast-forward mode. If the pushbutton is depressed for an interval less than 1 second, exit is to operations block 24 which directs the switching of the mechanism to a playback mode. If the answer in block 21 is negative, control advances to decision block 25 which checks to see if the mechanism is in a playback mode. If it is, exit is to decision block 26 which checks to see that the pushbutton is depressed for an interval longer than 0.5 second or not. If depressed for an interval longer than 0.5 second, exit is to operations block 27 which directs the switching of the mechanism to a stop mode. If the pushbutton is depressed for an interval less than 0.5 second, exit is to operations block 28 which directs the switching of the mechanism to a reverse mode. If the answer in block 25 is negative, exit is to operations block 27 to switch the mechanism to a stop mode. Thus, if the mechanism is operating in a mode other than playback, the mechanism can be set to a stop mode.

Figure 6:
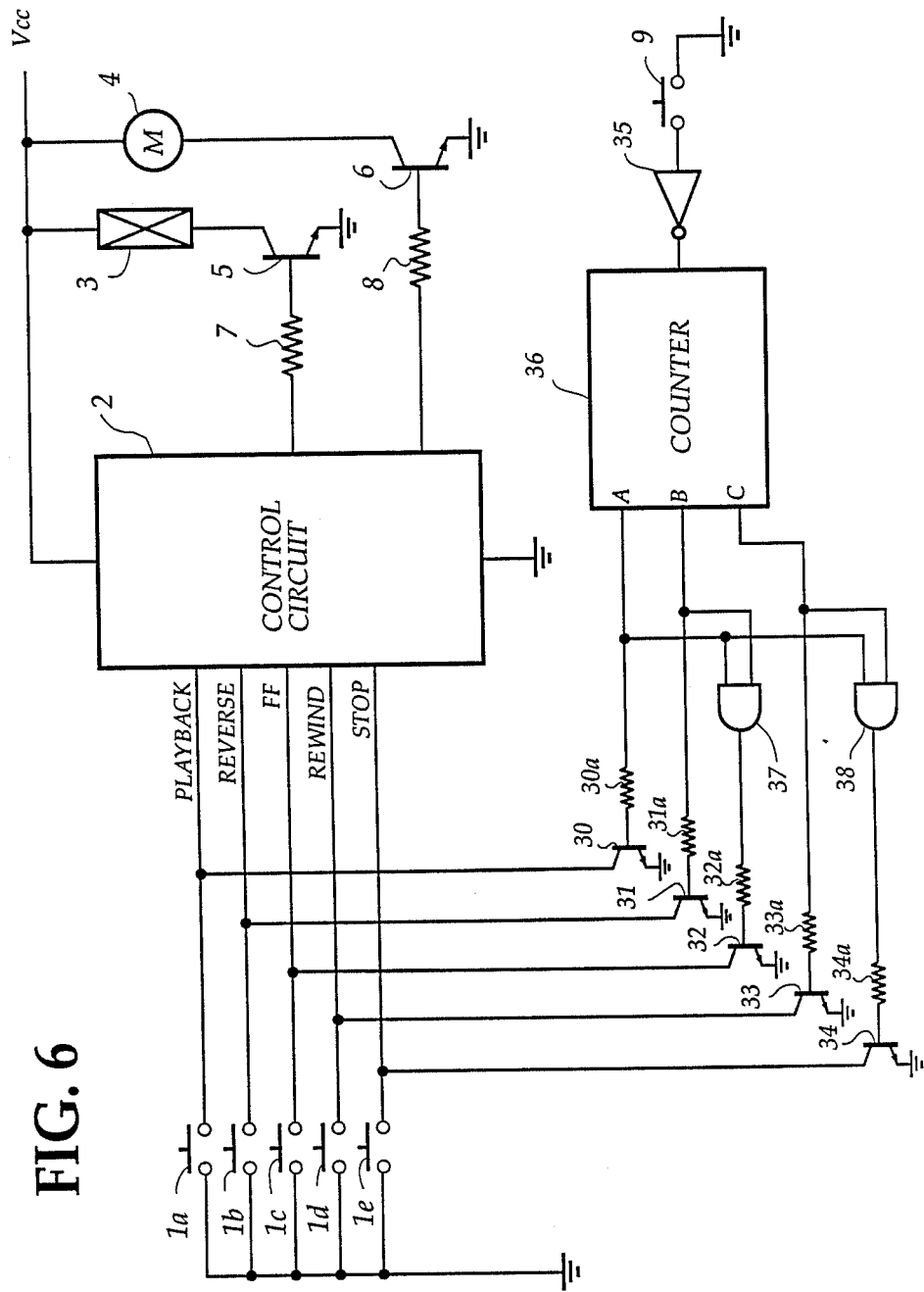
FIG. 6 is a circuit diagram of the apparatus according to another embodiment in which depressions of the pushbutton are counted to determine an operating mode of the apparatus.

Alternatively, the number of pulses generated by the operation of the pushbutton 9 can also be utilized to operate the mechanism as shown in FIG. 6. In this embodiment, pushbutton 9 is connected through an inverter 35 to a binary counter 36 having three parallel output lines A, B and C. The output lines A, B and C of the counter are directly connected to the bases of switching transistors 30, 31 and 33 through resistors 30a, 31a and 33a. The output lines A and B are combined in an AND gate 37 whose output is connected to the base of switching transistor 32 through resistor 32a, the output lines A and C being combined in an AND gate 38 whose output is connected to the base of switching transistor 34 through resistor 34a.

The emitters of all the switching transistors 30 to 34 are grounded with their collectors being connected in parallel with corresponding function switches, i.e., "playback", "reverse", "fast-forward", "rewind" and "stop" keys 1a through 1e, to the control circuit 2.

A single operation of pushbutton 9 causes the counter 36 to apply a logic 1 (high level) output to the output line A, turning the switching transistor 30 on. This applies an input signal to the control circuit 2 which would produce the same effect as that produced in response to the operation of the "playback" key 1a. If the pushbutton 9 is depressed twice, the output line B goes high, causing the switching transistor 31 to turn on. This applies an input signal to the control circuit 2 which would produce the same effect as that produced by in response to the operation of the "reverse" key 1b. In like manner, successive operations of the pushbutton more than thrice cause transistors 30 to 34 to selectively turn on, producing the same input signals to the control circuit 2 as those produced by the function keys.

The foregoing description shows only one preferred embodiment of the present invention. Various modifications are apparent to those skilled in the art without departing from the scope of the present invention which is only limited by the appended claims. Therefore, the embodiment shown and described is only illustrative, not restrictive.

What is claimed is:

1. A playback apparatus having function keys each selecting one of a plurality of operating modes thereof, said playback apparatus further including a remote control device comprising:
   a manually operating single pushbutton; and
   control means connected to said pushbutton for selectively determining one of the plurality of operating modes of said apparatus in accordance with successive depressions of said pushbutton.

2. A playback apparatus as claimed in claim 1, further comprising a cord extending from said apparatus to an earpiece, wherein said pushbutton is attached to said cord.

3. A playback apparatus as claimed in claim 1, wherein said pushbutton is located on one end face of a housing of said apparatus.

4. A playback apparatus having function keys each selecting one of a plurality of operating modes thereof, said playback apparatus further including a remote control device comprising:
   a manually operated single pushbutton; and
   control means connected to said pushbutton for selectively determining one of the plurality of operating modes of said apparatus in accordance with the length of time during which said pushbutton is depressed.

5. A playback apparatus as claimed in claim 4, further comprising a cord extending from said apparatus to an earpiece, wherein said pushbutton is attached to said cord.

6. A playback apparatus as claimed in claim 4, wherein said pushbutton is located on one end face of a housing of said apparatus.

7. A playback apparatus having function keys each selecting one of a plurality of operating modes thereof, said playback apparatus further including a remote control device comprising:
   a manually operated single pushbutton;
   counter means connected to said pushbutton for incrementing a count in response to depression of said pushbutton; and
   control means connected to said counter means for selectively determining one of the plurality of operating modes of said apparatus in accordance with said count.

8. A playback apparatus as claimed in claim 7, further comprising a cord extending from said apparatus to an earpiece, wherein said pushbutton is attached to said cord.

9. A playback apparatus as claimed in claim 7, wherein said pushbutton is located on one end face of a housing of said apparatus.

10. A portable playback apparatus having an electrically controlled mechanism and function keys each selecting one of a plurality of operating modes thereof, said playback apparatus further including a remote control device comprising:
    a manually operated single pushbutton; and
    control means connected to said pushbutton for selectively determining one of the plurality of operating modes of said apparatus in accordance with successive depressions of said pushbutton.

11. A portable playback apparatus as claimed in claim 10, further comprising a cord extending from said apparatus to an earpiece, wherein said pushbutton is attached to said cord.

12. A portable playback apparatus as claimed in claim 10, wherein said pushbutton is located on one end face of a housing of said apparatus.

13. A portable playback apparatus having an electrically controlled mechanism and function keys each selecting one of a plurality of operating modes thereof, said playback apparatus further including a remote control device comprising:
    a manually operated single pushbutton; and
    control means connected to said pushbutton for selectively determining one of the plurality of operating modes of said apparatus in accordance with the length of time during which said pushbutton is depressed.

14. A portable playback apparatus as claimed in claim 13, further comprising a cord extending from said apparatus to an earpiece, wherein said pushbutton is attached to said cord.

15. A portable playback apparatus as claimed in claim 13, wherein said pushbutton is located on one end face of a housing of said apparatus.

16. A portable playback apparatus having an electrically controlled mechanism and function keys each selecting one of a plurality of operating modes thereof, said playback apparatus further including a remote control device comprising:
   a manually operated single pushbutton;
   counter means connected to said pushbutton for incrementing a count in response to depression of pushbutton; and
   control means connected to said counter means for selectively determining one of the plurality of operating modes of said apparatus in accordance with said count.

17. A portable playback apparatus as claimed in claim 16, further comprising a cord extending from said apparatus to an earpiece, wherein said pushbutton is attached to said cord.

18. A portable playback apparatus as claimed in claim 16, wherein said pushbutton is located on one end face of a housing of said apparatus.

19. A portable playback apparatus having an electrically controlled mechanism, comprising:
   a manually operated single pushbutton;
   counter means connected to said pushbutton for incrementing a count in response to depression of said pushbutton;
   control means connected to said counter means for selectively determining one of a plurality of operating modes of said apparatus in accordance with said count;
   a plurality of mode selecting function keys associated respectively with said plurality of operating modes of said apparatus, said functions keys being connected to said control means over parallel input lines; and
   logic circuit means for converting said counts into a plurality of parallel signals and coupling said parallel signals respectively to said parallel input lines.

* * * * *